Aug. 20, 1946.  B. H. BROWALL  2,405,939
VARIABLE LEVERAGE BRAKE
Filed May 24, 1943   3 Sheets-Sheet 1
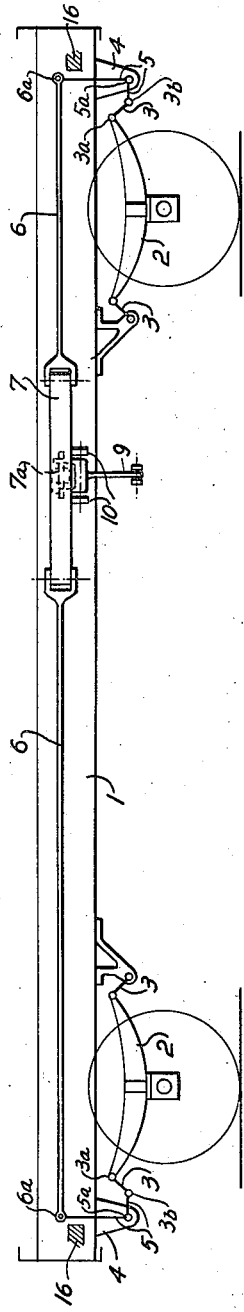
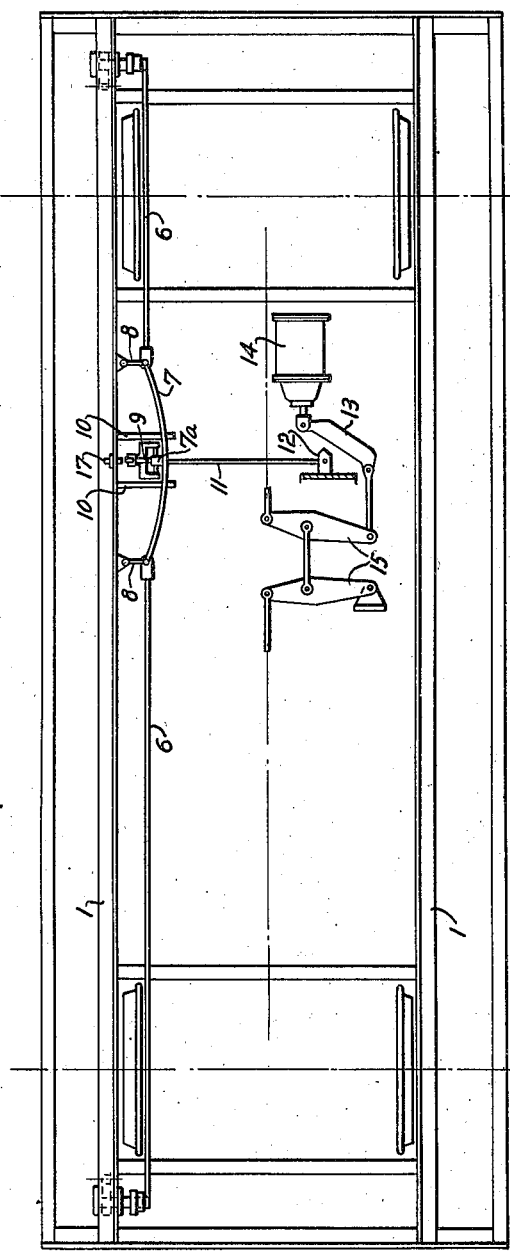
INVENTOR
B. H. BROWALL
BY
ATTORNEY

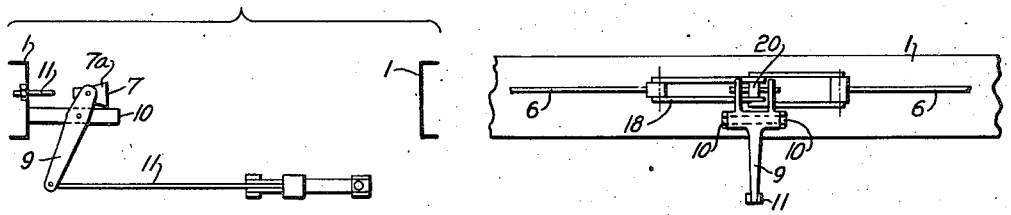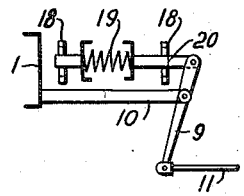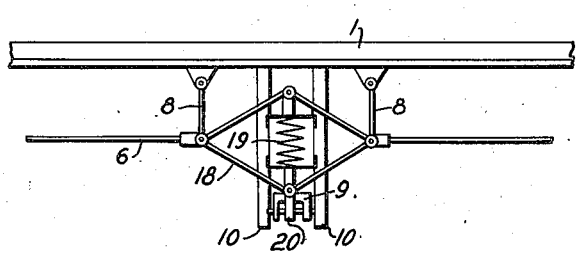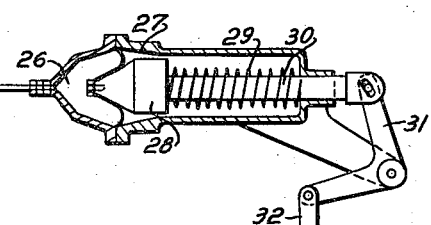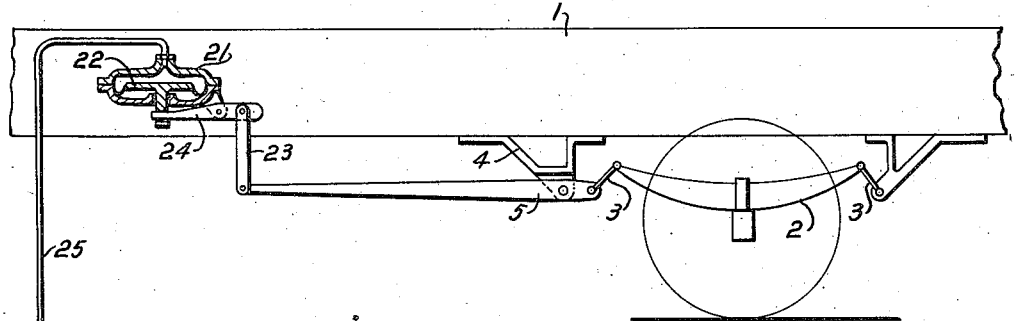

Aug. 20, 1946.    B. H. BROWALL    2,405,939
VARIABLE LEVERAGE BRAKE
Filed May 24, 1943    3 Sheets-Sheet 3

INVENTOR
B. H. BROWALL

BY E. F. Wendroth

ATTORNEY

Patented Aug. 20, 1946

2,405,939

UNITED STATES PATENT OFFICE 2,405,939

VARIABLE LEVERAGE BRAKE

Bert Henry Browall, Malmo, Sweden, assignor to Svenska Aktiebolaget Bromsregulator, Malmo, Sweden, a corporation of Sweden Application May 24, 1943, Serial No. 488,217
In Germany May 4, 1942

7 Claims. (Cl. 188—195)

This invention refers to such brakes for vehicles, especially railway vehicles in which the brake applying leverage of the brake rigging between the brake power source (brake cylinder) and the braking members (brake shoes) is variable in order to enable an adaptation of the braking power to the load of the vehicle, and in which the variation of the brake applying leverage is obtained by shifting of the fulcrum of one or more of the brake levers pertaining to the brake rigging. It is known that the shifting of this fulcrum according to the load of the vehicle can be effected automatically by an arrangement whose functioning is based on the resilient yielding of a spring under the vehicle load or a suitable part thereof. It must be borne in mind that the brake applying leverage, when varied by shifting of a brake lever fulcrum, is determined by the ratio between the two arms of the brake lever, one of these arms being lengthened and the other correspondingly shortened on the shifting of the fulcrum. Consequently, to obtain equally large changes in the brake applying leverage proportionate to equally large changes in the load of the vehicle, the shiftable fulcrum must be shifted by amounts decreasing with the increase of the brake applying leverage. This fact is mentioned in the French Patent No. 540,853 which also proposes certain means for obtaining the desired non-uniform shifting of the fulcrum. The therein and later proposed means for this purpose, however, have the disadvantage of comprising a rather complicated mechanism such as a slotted link and a block sliding in the slot of the link for operatively connecting the shiftable fulcrum to the spring. Ice or dirt can easily lead to a disturbance in the functioning of such a mechanism which, therefore, prejudices the smooth working and reliability of the arrangement.

This invention has for its object the provision of an equipment eliminating the necessity of a complication, such as that above exemplified, of the means for operatively connecting the shiftable fulcrum to the spring. According to the invention this object is obtained by a suitable arrangement of the spring and the means for subjecting it to the vehicle load or a suitable part thereof, so that the additional deflection or other change in the form of the spring caused by a certain increase of the vehicle load decreases with the increase of the vehicle load. With this and other objects in view which will become apparent from the following description, the invention consists in the construction, combination and organization of parts hereinafter described and finally pointed out in the appendant claims.

For a full understanding of the invention several constructional forms thereof are illustrated in the accompanying drawings in which—

Figs. 1, 2 and 3 are a diagrammatical side view, plan view and cross section, respectively, of a railway vehicle and illustrate a spring arrangement comprising a semi-elliptic leaf spring that is stretched longitudinally by rods transmitting a suitable part of the vehicle load onto the spring.

Figs. 4, 5 and 6 are a diagrammatical side view, plan view and cross section, respectively, of a spring arrangement in the form of a link parallelogram that is stretched along the one diagonal by the load transmission rods and against a compression spring acting in the direction of the other diagonal.

Fig. 7 is a diagrammatical view of a spring arrangement with a helical compression spring acted upon by a conically shaped hydraulic piston connected to its cylinder by a flexible diaphragm in such a way that the effective pressure area of the piston varies with the position of the piston in the cylinder.

Figures 8, 9:
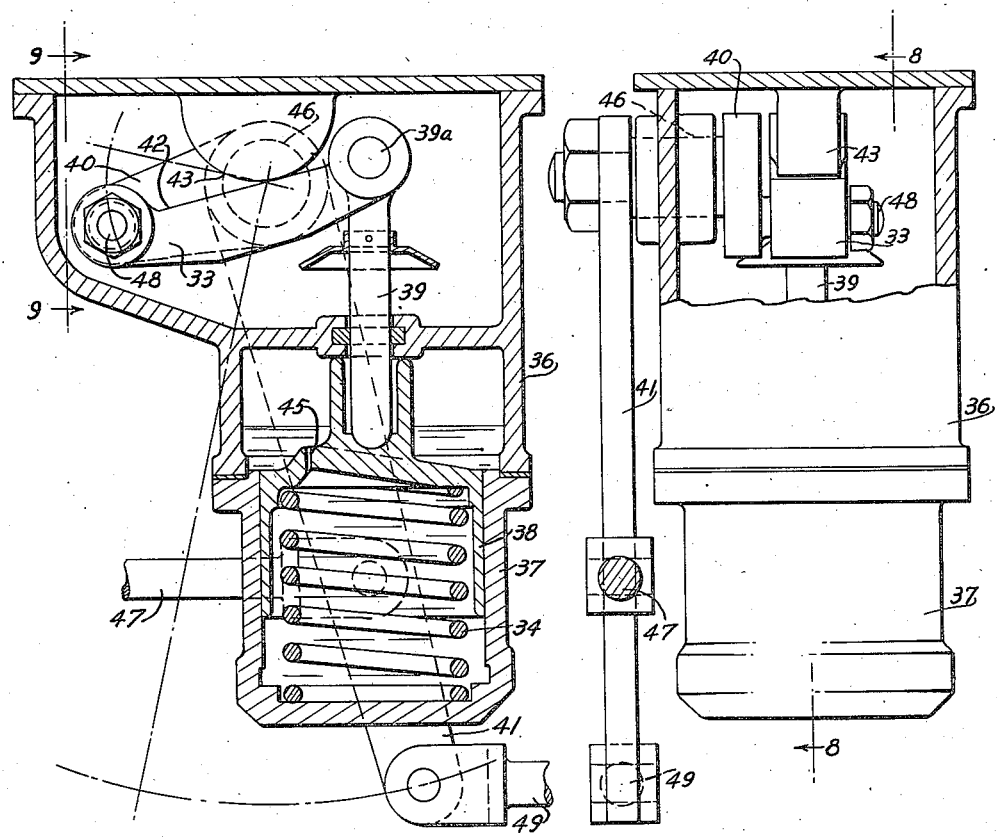
Fig. 8 is a sectional view, taken along line 8—8 of Fig. 9, of a spring arrangement with a helical compression spring onto which a suitable part of the vehicle load is transposed by way of a lever which rolls on its support, thereby changing its leverage during movement for compressing the spring.
Fig. 9 is another view, partly in section and partly in elevation, of the arrangement according to Fig. 8, the section being taken along line 9—9 of Fig. 8.

In the drawings, 1 indicates the frame of the railway vehicle on which the supporting springs 2 are mounted by spring suspenders in the form of links 3 as shown in Fig. 1. One link 3 at each end of the vehicle, instead of being mounted directly on its bracket, is mounted on one arm of a double-armed lever 5, which in the constructional embodiment shown in Fig. 1 is in the form of an angle lever and is pivoted to the specially shaped bracket 4 by means of a bolt 5a. The link 3 is pivoted to the end of the spring 2 by means of a bolt 3a and to the end of the said arm of the lever 5 by means of a bolt 3b, and the other arms of the two levers 5 at the opposite ends of the vehicle are connected to each other by means of a slidable two-part pull rod 6 hinged at its ends to the levers 5 by means of bolts 6a. The pulling force in this pull rod will be proportional to the weight and load of the vehicle reposing on the springs 2. In Fig. 2, the brackets 4 are arranged on one and the same side of the vehicle, but obviously the brackets may also be arranged on opposite sides of the vehicle at diagonally opposite corners thereof, if desired, the means for transmitting the pull to the corresponding part of the pull rod 6 then being modified in any appropriate manner.

Between the two parts of the pull rod 6 is located the spring arrangement according to the invention. As shown in Figs. 1–3 the spring arrangement comprises a leaf spring 7, having a semi-elliptic form as seen in the plan (Fig. 2), and having its ends linked to the two parts of the pull rod 6 as well as to the free ends of pendulum links 8 pivoted to the frame of the vehicle. In this arrangement the shiftable fulcrum 12 of the brake lever 13 may be shifted proportionally to the transverse deflection of the semi-elliptic spring 7 under the longitudinal stress to which it is subjected.

With the same change of vehicle load, i. e. with the same change of stress in the rod 6, the change in the deflection of the spring 7 decreases as the load of the vehicle increases so that by a suitable selection of the form and dimensions of the spring 7 such variation in the ratio between the shifting of the brake lever fulcrum and the change in the load of the vehicle may be obtained, which compensates the variation in the ratio between the shifting of the brake lever fulcrum and the change in the brake applying leverage, whereby a constant ratio between the load of the vehicle and the braking power on full application of the brake is obtained. To obtain the shifting of the fulcrum by the transverse deflection of the spring 7 the latter is provided at its centre with an ear 7a to which is linked a forklike arm of a double-armed lever 9. The lever 9 is pivoted to a fixed support 10 in the frame of the vehicle, said support consisting of two arms projecting perpendicularly from one of the longitudinal beams of the vehicle, the upper side of said arms serving as a guide surface on which slides the central part of the spring 7. By means of a rod 11 the other arm of the two-armed lever 9 is connected to the shiftable fulcrum 12 for the brake lever 13 which, in the example shown, is arranged as a special transmission lever between the brake cylinder 14 and the usual brake levers 15 of the brake rigging.

Abutments 16 and 17 are provided to limit the rotation of the angle-levers 5 and the stretching of the spring 7 respectively. Should the vehicle be non-uniformly loaded, these abutments also serve the purpose of limiting the pull on the spring 7 to the value corresponding to the load on the less loaded axle, as fully explained in the British Patent No. 490,591.

The arrangement described above and shown in Figs. 1–3, works in the following manner: When the load of the vehicle is but small and said load is increased by a certain quantity, the spring 7 undergoes a comparatively great deflection causing a relatively large shifting of the brake lever fulcrum 12. When the vehicle is heavily loaded, that is when the spring 7 is comparatively more strongly stretched, and the vehicle load is increased by the same quantity as before, the deflection of the spring increases by an amount, which, in relation to the change in the load of the vehicle, is smaller than that in the case of a lightly loaded vehicle. Consequently the amount by which the fulcrum 12 of the lever is shifted for a given change in the vehicle load, decreases with increasing load of the vehicle.

In the form of construction shown in Figs. 4–6 a transmission mechanism similar to that shown in Figs. 1–3 is used for the derivation of the force proportional to the load of the vehicle. This form of construction differs from the one shown in Figs. 1–3 only in the shape of the spring arrangement. Said arrangement consists of a link parallelogram 18 having two diagonally opposite angles linked to the two parts of the pull rod 6 whilst between the other two diagonally opposite angles is inserted a helical spring 19 which, by the stress between the two parts of the pull rod 6, is subjected to a pressure substantially perpendicular to the direction of the vehicle. The ends of the spring 19 are fitted into bowl-like members provided with pins pivoted to the appropriate angles of the link parallelogram 18. One of these pins has an extension 20, projecting beyond the parallelogram, and onto which extension 20 the upper fork-like end of the lever 9 is linked.

The pull in the rod 6 increases with the increasing load of the vehicle, whereby, owing to the yielding of the spring 19, the parallelogram 18 is stretched longitudinally. The smaller the angle becomes between each pair of the links linked to the parts of the pull-rod 6, the smaller becomes the increase of the force components acting on the spring 19 for a given increase of the pull in the pull rod 6, whereby, when the vehicle is lightly loaded, a certain increase of the vehicle load results in a greater increase of the compression of the spring 19 than when the vehicle is heavily loaded. The shifting of the lever fulcrum by the change in the length of the helical spring 19, corresponding to the change in the deflection of the leaf spring 7 in Fig. 1, is produced in exactly the same way as in the prescribed form of the construction by means of the lever 9 and rod 11, as best shown in Fig. 6. Instead of using the whole link parallelogram, it is possible to use but one half of it so that the spring arrangement consists of only two of the links connected each to one of the two parts of the pull rod 6 and acted upon by a spring in a direction perpendicular to the direction of the pull rod 6, the other end of the spring supporting itself against the beam 1, for example.

In the arrangement shown in Fig. 7, the force deviated from the load of the vehicle is transmitted by means of a hydraulic transmitting device. A fluid pressure is produced in a pressure chamber 21 proportionate to the load of the vehicle by means of a piston 22 subjected to the force deviated from the supporting spring 2 via the link and lever mechanism 3, 5, 23, 24. The piston 22 is made pressure tight by means of a flexible diaphragm. The pressure chamber 21 is connected by a pipe 25 to the pressure chamber 26 in a conical cylinder 27 for a piston 28 having a conical top connected in such a manner to the cylinder 27 by a flexible diaphragm that the effective pressure area of the piston varies with the position of the piston in the cylinder. The piston 28 is acted on by a spring 29 in a direction opposite to that of the pressure in the pressure chamber 26, said spring 29 changing its length proportionally to changes in the load exerted on the spring by the piston 28. Owing to the construction of the cylinder 27 and the piston 28 the effective pressure area of the piston decreases on movement of the piston against the action of the spring 29. Consequently the increase in the load on the spring caused by a given increase of the fluid pressure in the hydraulic pressure transmitting device will become the smaller, the higher the vehicle load, and thereby the said fluid pressure, rises. The movements of the piston 28 are transmitted by means of the piston rod 30 and the lever 31 to rod 32 which actuates the shiftable fulcrum for the variable leverage lever of the brake rigging. In this way the cylinder 27, the piston 28 and the spring 29 together form a spring arrangement of a stiffness that increases with the load acting thereon.

In the form of construction shown in Figs. 8 and 9 the spring arrangement comprises a helical spring 34 and a lever 33 partaking in the transmission of a part of the load of the vehicle onto the spring and rolling on a suitably curved support 43 so that the lever ratio of the lever varies with the vehicle load and in such a way that the stiffness of the spring arrangement increases with the load of the vehicle. The lever 33 and the spring 34 are contained in a casing 36, one part of which forms a cylinder 37 for a piston 38. The piston 38 is acted upon in one direction by the spring 34, and in the opposite direction by a pin 39 linked by means of a bolt 39a to one end of the lever 33 which is adapted to be acted upon by a force derived from and proportional to the load of the vehicle. For this purpose the other end of the lever 33 is linked by means of a bolt 48 to one arm 40 of a crank lever, the other arm 41 of which is adapted to be connected by means of a rod 47 or the like to a lever arranged in a like or similar manner as the lever 5 in Fig. 1 or 7. The lever arms 40 and 41 are disposed respectively inside and outside of the casing 36 and are pivoted thereto by means of a pivot pin 46. The lever 33 is provided between its ends with a track 42 for rolling contact with a stationary curved support 43 in the casing 36. The pivot 46 of the crank lever 40, 41 is so positioned in relation to the curved surface of the support 43 as to minimize the sliding movement, and thus the friction, occurring between the rolling track 42 and said surface when lever 33 is turned against, or by, the action of spring 34. On an increase of the load of the vehicle the arm 41 of the crank lever acted on by the force derived from the vehicle load, is turned to the left as viewed in Fig. 8. The left arm of the lever 33 to which the arm 40 of the crank lever is linked, is thereby caused to swing upwards, so that thanks to the curved support 43 for the lever 33, the right end of the lever 33 is pressed downwards. During this movement the lever 33 changes the position of its fulcrum point by said point travelling along the rolling track 42 to the left, whereby the leverage of the lever is changed. The more the lever arm 41 is urged to the left under the increasing vehicle load, the greater becomes the leverage of lever 33 by which the force of spring 34 opposes the force which the lever arm 41 receives from rod 47, and the smaller becomes the change in the compression of the spring 34, and thus in the position of the lever arm 41, caused by a certain change in the load of the vehicle. The desired shifting of the shiftable fulcrum (compare 12 in Fig. 2) for the variable leverage brake lever (compare 13 in Fig. 2) may be obtained preferably by connecting said shiftable fulcrum to crank lever arm 41 by means of a connecting rod 49 or the like for transmitting the movements of the lever arm 41 to said shiftable fulcrum.

In the practical construction, the piston 38 may serve preferably as a hydraulic shock absorbing piston. For this purpose the cylinder 37 and the chamber 44 above same are filled with a liquid, and a small throttle port 45 is provided in the bottom of the piston 38. To prevent accumulation of air under the piston 38 the interior thereof is constructed in such a way as to slope upwards from all sides towards the location of the throttle port 45.

The invention is not limited to the herein described and illustrated examples, it being possible within the spirit and scope of the invention to use other spring arrangements, which, according to the purposes prescribed by the invention, are of a stiffness that increases with the load of the vehicle. A helical spring with increasing pitch may be used, which when subjected to an increasing pressure increases in stiffness by the windings of the spring progressively coming into contact with each other, thereby progressively reducing the effective yielding length of the spring.

What I claim and desire to secure by Letters Patent is:

1. In a variable leverage brake for vehicles, an equipment for automatically varying the brake applying leverage in correspondence to the varying load of the vehicle, comprising a brake lever fulcrum that is shiftable to vary the brake applying leverage, means for deriving a force proportional to the vehicle weight and load, a structure comprising a spring, means for applying said force to said structure in such a manner as to flex said spring disproportionally to the force applied, and means operatively connecting said structure to said fulcrum for determining the shifting thereof.

2. In a variable leverage brake for vehicles, an equipment for automatically varying the brake applying leverage in correspondence to the varying load of the vehicle, comprising a brake lever fulcrum that is shiftable to vary the brake applying leverage, means for deriving a force proportional to the vehicle weight and load, a structure comprising a semi-elliptical leaf spring, means for applying said force to said structure so as to stretch said semi-elliptical leaf spring longitudinally, and means operatively connecting said structure to said fulcrum for governing the shifting thereof.

3. In a variable leverage brake for vehicles, an equipment for automatically varying the brake applying leverage in correspondence to the varying load of the vehicle, comprising a brake lever fulcrum that is shiftable to vary the brake applying leverage, means for deriving a force proportional to the vehicle weight and load, a structure comprising a semi-elliptical leaf spring, means for applying said force to said structure so as to stretch said semi-elliptical leaf spring longitudinally, and means operatively connecting the middle of said spring to said fulcrum for determining the shifting thereof in dependence upon the transverse deflections of said semi-elliptical leaf spring.

4. In a variable leverage brake for vehicles, an equipment for automatically varying the brake applying leverage in correspondence to the varying load of the vehicle, comprising a brake lever fulcrum that is shiftable to vary the brake applying leverage, means for deriving a force proportional to the vehicle weight and load, a structure comprising a spring and transmission means acted upon by said force and transmitting the same to said spring, said transmission means being arranged so as to transmit said force to said spring in a varying proportion decreasing with the increase of said force, and means operatively connecting said structure to said fulcrum for determining the shifting thereof.

5. In a variable leverage brake for vehicles, an equipment for automatically varying the brake applying leverage in correspondence to the varying load of the vehicle, comprising a brake lever fulcrum that is shiftable to vary the brake applying leverage, means for deriving a force proportional to the vehicle weight and load, a structure comprising a spring and joined links, means for applying said force to said structure so as to stress the spring in a direction substantially perpendicular to the direction of said force, and means operatively connecting said structure to said fulcrum for governing the shifting thereof.

6. In a variable leverage brake for vehicles, an equipment for automatically varying the brake applying leverage in correspondence to the varying load of the vehicle, comprising a brake lever fulcrum that is shiftable to vary the brake applying leverage, means for deriving a force proportional to the vehicle weight and load, a structure comprising a link parallelogram and a compression spring acting on the link parallelogram in the direction of one diagonal, means for applying said force to said link parallelogram so as to stretch the same in the direction of the other diagonal against the action of said spring, and means operatively connecting said structure to said fulcrum for effecting the shifting thereof.

7. In a variable leverage brake for vehicles, an equipment for automatically varying the brake applying leverage in correspondence to the varying load of the vehicle, comprising a brake lever fulcrum that is shiftable to vary the brake applying leverage, means for deriving a force proportional to the vehicle weight and load, a structure comprising a spring and transmission means acted upon by said force, said transmission means being operative for transmitting said force to said spring in a varying proportion decreasing with the increase of said force, said transmission means comprising a lever and a support on which said lever, during movement, rolls so as to change its leverage, and means operatively connecting said structure to said fulcrum for deciding the shifting thereof.

BERT HENRY BROWALL.